United States Patent [19]

Eiffler et al.

[11] Patent Number: 5,278,193
[45] Date of Patent: Jan. 11, 1994

[54] ION EXCHANGE RESIN BEADS HAVING AMINOALKYLPHOSPHONIC GROUPS AND PROCESSES FOR PREPARING THEM

[75] Inventors: Jurgen Eiffler; Nicholas Moon, both of Stade, Fed. Rep. of Germany

[73] Assignee: The Dow Chemical Company, Midland, Mich.

[21] Appl. No.: 380,568

[22] Filed: Jul. 14, 1989

[30] Foreign Application Priority Data

Jul. 18, 1988 [GB] United Kingdom ............... 8817051

[51] Int. Cl.$^5$ ................................ C08F 8/24
[52] U.S. Cl. ..................... 521/31; 521/30
[58] Field of Search .................. 521/30, 31, 32

[56] References Cited

U.S. PATENT DOCUMENTS 4,895,905 1/1990 Schneider et al. ............ 525/154

FOREIGN PATENT DOCUMENTS 2848289 12/1980 Fed. Rep. of Germany .
8302947 9/1983 PCT Int'l Appl. .
385977 6/1973 U.S.S.R. .

Primary Examiner—Thurman K. Page
Assistant Examiner—Peter F. Kulkoski

[57] ABSTRACT

The ion exchange resin beads have functional groups of formula I wherein $R^1$, $R^2$, $R^3$, $R^4$, m, r and q have the meanings stated in claim 1 and which have a matrix of a cross-linked polymer wherein the level of cross-linkages is decreased in the shell area is compared to the core area.

These ion exchange resin beads are prepared by reacting resin beads which have primary or secondary amino groups and the mentioned matrix of a cross-linked polymer with a1) a hypophosphite salt in the presence of an acid, or a2) a hypophosphorous acid and b) formaldehyde or a formaldehyde releasing compound.

3 Claims, 1 Drawing Sheet

ION EXCHANGE RESIN BEADS HAVING AMINOALKYLPHOSPHONIC GROUPS AND PROCESSES FOR PREPARING THEM

BACKGROUND OF THE INVENTION

The present invention relates to the ion exchange resin beads which are for example useful for reducing the concentration of multi-valent alkaline earth or transition metal cations in an aqueous solution, to processes for preparing these ion exchange resin beads and to the use of the ion exchange resin beads.

It is well known in several areas of technology that cations of the alkaline earth metals and transition metals are desired to be removed from solutions due to their value or to the detrimental effects they can cause. For example, there are situations where these cations are desired to be removed from the solutions, to the greatest extent possible, prior to the a) use of the liquid in chemical or separation processes,
b) consumption of the liquid or
c) release of the liquid into the environment.

It has long been known that it is possible to exchange detrimental ions in a stream with more acceptable ions and/or chelate ions to remove them from the streams. In this regard there have been many developments made over the years in this area of specialized polymeric resins and specialized functional groups which can be chemically bound to such resins to provide improved systems for the removal of various anions and cations. Notwithstanding this activity it remains quite unpredictable which combinations of functional groups and polymeric resins will prove to be suitable for the removal of a particular type of ion. The published PCT application WO 83/02947 discloses macroporous alkylaminophosphonic chelating resins for purifying brines. British Patent 853,834 relates to ion-exchange resins containing substituted-aminomethyl phosphonate groups.

British Patent Specification 1,230,363 discloses shaped shell graft copolymeric particles which comprise an inert polymeric nucleus having grafted on it a polymeric shell. The nucleus may be cross-linked. The shell contains separate and discrete regions of ion exchange reactive groups "opposite signs". By "opposite signs" is meant that the shell contains a) anion and cation exchange groups or b) strongly basic and weakly basic groups or c) strongly acidic and weakly acidic groups.

Published German Patent Application 1,695,449 discloses a process for preparing substituted (aminomethyl)phosphinic acids by reacting hypophosphorous acid with an amine and an aldehyde. If the produced (aminomethyl) phosphinic acids are polymeric compounds, they can be used for impregnating materials as for ion exchange applications.

In the published German Patent Application 28 48 289 and British Patent Application 2 040 950 macroporous styrene-divinylbenzene polymers containing (aminomethyl)(hydroxymethyl)phosphinic acid groups have been suggested for selectively separating the cations and anions of heavy metals such as $WO_3^{2-}$ and $Cu^{2+}$. Such functionalized polymers are prepared according to the teaching of German Patent Application 38 48 289 by aminating cross-linked chloromethylated styrene-divinylbenzene polymers with urotropin (hexamethylene tetramine), monoethanolamine, or ethylene diamine and reacting the aminated polymer with formalin (an aqueous solution of formaldehyde), sodium hypophosophite and concentrated hydrochloric acid. However, the optimized macroporous styrene-divinylbenzene polymers containing (aminomethyl)(hydroxymethyl)phosphinic acid groups do not have an excellent copper capacity. In particular when these macroporous polymers containing alpha-aminophosphinic acid groups are used in aqueous solutions are an elevated temperature, their copper or calcium capacity is insufficient for some applications.

Accordingly, it would be desirable to provide new polymers containing ion exchange groups which have the same or a higher cation exchange capacity such as copper capacity or calcium capacity. Since many processes for removal of certain cations from solutions are advantageously carried out at elevated temperatures, typically from about 35° C. to about 70° C., such as the removal of calcium from brine solutions used for the production of chlorine, it would be particularly desirable to provide new polymers containing ion exchange groups which have a high cation exchange capacity, such as calcium or copper capacity, at elevated temperatures. By "elevated temperatures" is meant 35° C. or higher, preferably at least about 40° C.

In many ion exchange processes, the resins are subjected to stresses which cause substantial breakage in the beads. Said stresses may be mechanical, i.e., due to crushing or collisions between beads or the beads and their containers, or osmotic, such as when the beads are subjected to sudden or repeated changes in electrolyte concentration. The breakage of the ion exchange beads causes substantial losses in the efficiency of the ion exchange column and large costs in replacing the broken resins.

Accordingly, it would also be desirable to provide new polymers containing ion exchange groups which have a high resistance to osmotic shock or to mechanical stress.

Furthermore, it would be desirable to provide a new, efficient process for preparing these polymers.

SUMMARY OF THE INVENTION

One aspect of the present invention is a plurality of ion exchange resins beads having
i) (aminomethyl)(hydroxymethyl)phosphinic acid groups and
ii) a matrix of a cross-linked polymer wherein the level of cross-linkages is decreased in the shell area as compared to the core area.

Another aspect of the present invention is a process for preparing these ion exchange resin beads by reacting resin beads having
i) primary or secondary amino groups and
ii) a matrix of a cross-linked polymer wherein the level of cross-linkages is decreased in the shell area as compared to the core area with
a1) a hypophosphite salt in the presence of an acid or
a2) hypophosphorous acid and
b) formaldehyde or a formaldehyde releasing compound to produce the corresponding ion exchange resin beads having (aminomethyl)(hydroxymethyl)phosphinic acid groups.

By the term "(aminomethyl)(hydroxymethyl) phosphinic acid groups" is meant the free acid as well as the salts thereof, preferably the alkali metal salts such as the sodium or potassium salt.

Another aspect of the present invention is a process for preparing ion exchange resin beads having functional groups of formula $$-(CH)_m\!-\!\!\left[\begin{array}{cc}R^1 & R^2\\ | & |\\ N\!-\!(CH)_r\\ | \\ R^4\end{array}\right]_{\!q}\!\!-\!N\!-\!CH_2\!-\!P\!\!\begin{array}{c}\diagup\!\!\!\!O\\ \diagdown OR^3\end{array} \quad (I)$$
$$\phantom{xxxxxxxxxxxxxxxxxxxxxxxxxxxxx}|\phantom{xxxxxxx}|$$
$$\phantom{xxxxxxxxxxxxxxxxxxxxxxxxxxxxx}R^1$$
$$\phantom{xxxxxxxxxxxxxxxxxxxxxxxxxxx}CH_2\!-\!OH$$

wherein
each $R^1$ independently is hydrogen or —CH$_2$—PO$_2$R$^3$—CH$_2$OH;
q is zero;
each $R^3$ independently is hydrogen or a cation;
each $R^4$ independently is hydrogen, alkyl, cycloalkyl or aryl; and
m is from 1 to 12, preferably from 1 to 6, more preferably from 1 to 3,
by reacting resin beads having groups of formula $$-(CH)_m\!-\!X$$
$$\phantom{xx}|$$
$$\phantom{xx}R^4$$

wherein X is halogen and $R^4$ and m have the meanings stated above and having an above mentioned matrix with hexamethylene tetramine to produce the corresponding resin beads having functional groups of formula IV $$-(CHR^4)_m\!-\!N^+\!\!\!\begin{array}{c}\text{(hexamethylenetetramine cation)}\end{array}\!\!\!X^- \quad (IV)$$

and reacting the produced intermediate having groups of formula IV with a1) a hypophosphite salt in the presence of an acid or with a2) hypophosphorous acid in a single step in the presence of water without addition of a substantial amount of formaldehyde or a formaldehyde releasing compound.

Yet another aspect of the present invention is the use of the ion exchange resin beads of the present invention for reducing the concentration of alkaline earth or transition metal ions in a solution containing such ions.

Yet another aspect of the present invention is a method of reducing the concentration of alkaline earth on transition metal ions in a solution containing such ions by contacting the solution with the ion exchange resins beads.

DETAILED DESCRIPTION OF THE INVENTION

Figure 1:
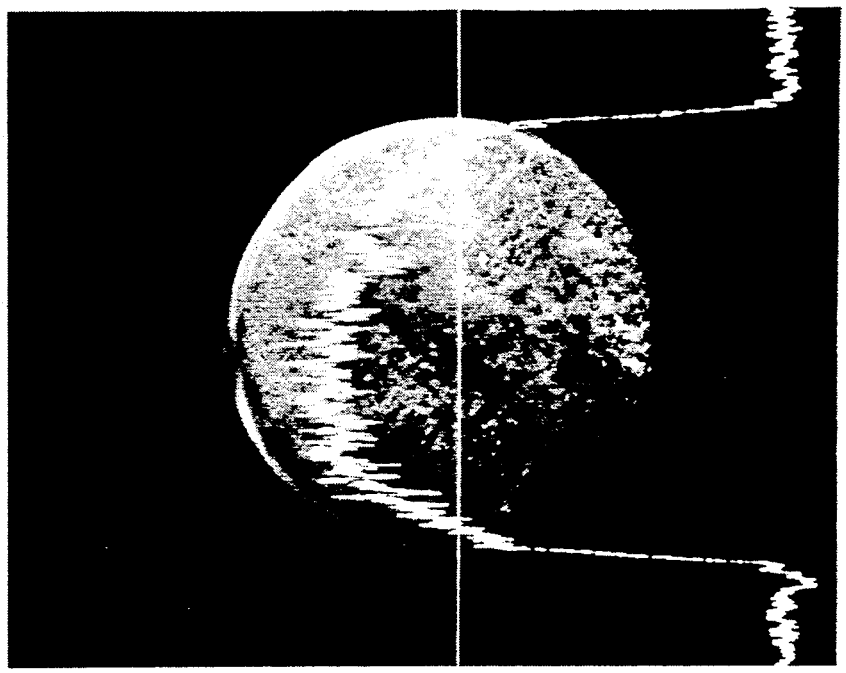
FIG. 1 illustrates the distribution of (aminomethyl)-(hydroxymethyl)phosphinic acid groups in known macroporous resin beads.

It has been found that the ion exchange resin beads of the present invention are useful for adsorbing and removal of alkaline earth metal ions such as the calcium, magnesium, strontium and barium ions and transition metal ions such as those of group VIII of the periodic table of elements, for example of iron, cobalt, nickel, or group IIIB such as lanthanum, of group IIB such as zinc, cadmium and mercury, of group IIIA such as aluminum, gallium, of group IVA such as lead and preferably of group IB such as copper and silver, or $UO_2^{2-}$, from a solution containing such ions, preferably from an aqueous solution such as water. Most preferably, the ion exchange resins of the present invention are used for adsorption and removal of calcium and copper ions such as $Cu^{2+}$ from an aqueous solution.

The ion exchange resin beads preferably have functional groups of formula $$-(CH)_m\!-\!\!\left[\begin{array}{cc}R^1 & R^2\\ | & |\\ N\!-\!(CH)_r\\ | \\ R^4\end{array}\right]_{\!q}\!\!-\!N\!-\!CH_2\!-\!P\!\!\begin{array}{c}\diagup\!\!\!\!O\\ \diagdown OR^3\end{array} \quad (I)$$
$$\phantom{xxxxxxxxxxxxxxxxxxxxxxxxxxxxx}|\phantom{xxxxxxx}|$$
$$\phantom{xxxxxxxxxxxxxxxxxxxxxxxxxxxxx}R^1$$
$$\phantom{xxxxxxxxxxxxxxxxxxxxxxxxxxx}CH_2\!-\!OH$$

wherein
each $R^1$ independently is hydrogen, alkyl, cycloalkyl, —(CH$_2$)$_n$—COOR$^5$, —(CH$_2$)$_p$—SO$_3$R$^3$, —(CH$_2$)$_p$—PO$_3$(R$^5$)$_2$ or —(CH$_2$)$_p$—PO$_2$R$^3$—CH$_2$OH,
each $R^2$ independently is hydrogen, alkyl of 1 to 3 carbon atoms, hydroxy or —COOR$^5$,
each $R^3$ independently is hydrogen or a cation,
each $R^4$ independently is hydrogen, alkyl, cycloalkyl or aryl,
each $R^5$ independently is hydrogen, a cation, alkyl or cycloalkyl,
m is from 0 to 12,
n is from 1 to 12,
p is from 1 to 6,
r is from 1 to 6, and
q is on the average from 0 to 100.

When $R^1$, $R^4$ and/or $R^5$ represent an alkyl group, the alkyl group generally has from 1 to 12, preferably from 1 to 6 and more preferably from 1 to 3 carbon atoms. Preferred examples thereof are methyl, ethyl, n-propyl, isopropyl, n-butyl, isobutyl, tert butyl, pentyl, n-hexyl, heptyl, the octyl groups such as n-octyl, the nonyl groups such as n-nonyl, decyl or dodecyl.

When $R^1$, $R^4$ and/or $R^5$ represent a cycloalkyl group, the cycloalkyl group generally has from 3 to 12, preferably from 3 to 8 and more preferably from 4 to 6 carbon atoms such as cyclobutyl or cyclopentyl and most preferably cyclohexyl.

The preferred aryl radical $R^4$ is phenyl or benzyl.

Preferably $R^1$ and $R^4$ each independently are one of the above-mentioned $C_{1-3}$-alkyl groups or hydrogen with hydrogen being the most preferred radical.

Preferably, $R^5$ is hydrogen or a cation of the type stated for $R^3$ below.

Each $R^3$ independently is hydrogen or a cation. Preferred cations are alkali metal ions such as sodium or potassium, alkaline earth metal or transition metal ions such as those mentioned above, quaternary ammonium ions such as $NH_4^+$ or tetraalkyl ammonium ions wherein the alkyl groups preferably have 1 to 12, more preferably 1 to 6, most preferably 1 to 4 carbon atoms, or the tetraphenylammonium ion.

m is from 0 to 12, preferably from 0 to 6, more preferably from 1 to 6, most preferably from 1 to 3, such as 1, 2 or 3;

n is from 1 to 12, preferably from 1 to 6, more preferably from 1 to 3;

p is from 1 to 6; preferably from 1 to 3, more preferably 1 or 2;

r is from 1 to 6; preferably from 1 to 3, more preferably 2;

q is from 0 to 100, preferably from 0 to 15, more preferably from 0 to 5.

The preferred meanings of $R^1$ to $R^5$, m, n, p, q and r are mainly dependent on the intended use of the water-insoluble ion exchange resin beads. For example, when using the water-insoluble ion exchange resin beads for removal of alkaline earth metal ions and transition metal ions from aqueous solutions, $R^3$ preferably is hydrogen or an alkali metal ion, more preferably the sodium ion or potassium ion.

The most preferred functional groups are those of formula I wherein each $R^1$ independently is hydrogen or $—CH_2—PO_2R^3—CH_2OH$ $OCH_2—PO—CH_2OH$, q is zero and $R^3$, $R^4$ and m have the meanings stated above. When $R^3$ is a cation it preferably is an alkali metal ion, most preferably the sodium ion, or a tetraalkylammonium ion. Preferably, m is 1.

The meanings of $R^1$ to $R^5$, m, n, p, q, and r are not necessarily the same in all functional groups of formula I.

The ion exchange resin beads of the present invention have a cross-linked polymeric matrix. The useful types of polymers are well known in the art and are described in the book "Ion exchange" F. Helfferich, McGraw-Hill Book Co., N.Y. 1962 and in "Ullmann's Enzyklopädie der Technischen Chemie", 4th Edition, Vol 13, pages 279 et seq. One known type of matrix is based on phenol/formaldehyde condensation polymers which are cross-linked with an aldehyde, a chlorinated hydrocarbon or an epoxy compound. The preferred matrixes are cross-linked polystyrene or poly-(alpha-methyl styrene) or cross-linked polymer beads of styrene or alpha methyl styrene which is substituted at the benzene ring with a $C_{1-6}$-alkyl group, such as methyl, ethyl, propyl, butyl or hexyl, or a halogenoalkyl group, such as chloromethyl, or aminomethyl. The cross-linking agent preferably is an alkyl acrylate or a di- or polyvinyl compound such as trivinyl cyclohexane, ethylene glycol dimethacrylate or trimethylolpropane triacylate, most preferably divinylbenzene. Divinylbenzene typically is copolymerized with the substituted or unsubstituted styrene.

The following description of the ion exchange resins of the present invention relates to ion exchange resins which have such a preferred cross-linked styrene-divinylbenzene copolymer matrix, although the scope of the present invention is not restricted thereto.

The ion exchange resin beads of the present invention have a matrix of a cross-linked polymer wherein the levels of cross-linkages is decreased in the shell area as compared to the core area.

The described distribution of cross-linkages is referred to as "core/shell morphology".

By the term "core/shell morphology" it is meant that the polymeric structure of the copolymer beads changes from the inside to the outside of the bead. Such changes in polymeric structure may be somewhat gradual yielding a bead having a gradient of polymeric structure along the radium. Alternatively, said changes in polymeric structure may be relatively abrupt as one moves along a radium of the bead outward from the center. The effect in any case is that these gel type resin beads have a relatively distinct core having one polymeric structure and a relatively distinct shell having another polymeric structure. The core/shell morphology of the copolymer beads is detectable using known analytical techniques such as those mentioned in European patent application 0 101 943. Beads of this type will have a shell which is softer (less friable and more elastic) than the core of the bead. This permits the bead to distribute energy throughout its structure when subjected to external stresses and pressures while retaining its shape and integrity. It is believed that this improves the crush strength and resistance to osmotic shock of such core/shell copolymer beads. In addition to the difference in cross-link densities of the core and shell, the polymer in the shell can advantageously have a higher molecular weight than the polymers of the core. This also can impart mechanical strength to the bead and increase its resistance to osmotic shock.

It has been found that these types of resin beads, while recognized to have good strength properties, have surprisingly good capacity, when functionalized with (aminomethyl) hydroxymethyl)-phosphinic acid groups, preferably those of formula I, for multi-valent cations of alkaline earth metals and transition metals. Although not limiting the claims or scope of the present invention, it is theorized that the process described below for preparing the resin beads results in the polymer shell around the beads having ideal combinations of polymer molecular weight, cross-linking, and porosity for functionalization with chelating groups and contacting and removing maximum amounts of these specific ions.

The polymeric matrixes of the resin beads having a core/shell morphology are advantageously prepared by (a) forming a suspension of a plurality of cross-linked polymer matrixes containing polymerization-initiating free radicals and (b) contacting said matrixes with a monomer feed which is at least partially imbibed by said matrixes and polymerizing said monomer. The preparation of the polymeric matrixes of the resin beads having a core/shell morphology, i.e. the non-functionalized resin beads is described in detail in European Patent Application 101 943. As described therein the cross-linked copolymer beads exhibiting a core/shell morphology are preferably prepared by contacting (a) a suspension of cross-linked polymer matrixes, preferably with an average diameter of 10 to 750 micrometers, more preferably of 100 to 750 micrometers, in the presence of a suspending agent with (b) a substantially continuous-addition monomer feed which is at least partially imbibed by said polymer matrixes and, when polymerized, forms 40 to 90 percent by weight or the resin beads. Free radical polymerization is initiated only by free radicals already contained in the polymer matrixes to polymerize such additional monomer while no additional free-radical initiation is done. In this manner the copolymer beads having an average diameter in the range of 50 to 2000 micrometers, preferably in the range of 200 to 12000 micrometers, and exhibiting a core/shell morphology are prepared. The teaching in the European Patent Application 101 943 of how to prepare the non-functionalized resin beads is included herein by reference.

The resin beads having the above mentioned cross-linked matrix, for example poly(vinyl aromatic) copolymer beads, most preferably of styrene/divinylbenzene copolymers, are converted to resins having primary or secondary amino groups using techniques well known in the art. These techniques are for example described in "Ullmann's Enzyklopädie der Technischen Chemie", 4th Edition, Vol. 13, pages 301 ff. and in European Patent Application 0 101 943.

Resins having amino groups which are directly bound to the aromatic rings of the matrix can for example be prepared in a known way by the nitration of the above-described poly-vinyl aromatic) copolymer beads and reduction of the nitro groups which are bound to the aromatic ring to amino groups.

According to another method the beads are haloalkylated in a first step, preferably halomethylated, most preferably chloromethylated. Methods for haloalkylating the cross-linked copolymers and the haloalkylating agents included in such methods are also well known in the art. The haloalkylating agent can be substituted, e.g. by aryl. Reference is made thereto for the purposes of this invention. Illustrative of such are U.S. Pat. Nos. 2,642,417; 2,960,480; 2,597,492; 2,597,493; 3,311,602 and 2,616,817 and *Ion Exchange* by F. Helfferich, published in 1962 by McGraw-Hill Book Company, N.Y. and above mentioned "Ullmann's Enzyklopädie der Technischen Chemie". Typically, the haloalkylation reaction involves swelling of the cross-linked polymer with a haloalkylating agent, preferably bromomethylmethyol ether, chloromethylmethyl ether or a mixture of formaldehyde and hydrochloric acid, most preferably chloromethylmethyl ether and then reacting the polymer and haloalkylating agent in the presence of Friedel-Craft catalyst such as zinc chloride, iron chloride or aluminum chloride.

According to this method, for example polymer beads having groups of formula $-(CHR^4)_m-X$ wherein X is halogen, preferably chlorine, m is from 1 to 6, preferably from 1 to 3, more preferably 1, and $R^4$ is hydrogen, alkyl, cycloalkyl or aryl, are prepared.

Generally, the above mentioned resin beads having primary or secondary amino groups are prepared in a second step from the haloalkylated beads by contacting said bead with an amination agent such as ammonia, a primary amine or a secondary amine.

Preferably, aminated resin beads are prepared which have functional groups formula II

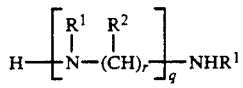

wherein $R^1$, $R^2$, $R^4$ r and q have the meanings stated above with respect to formula I and m is from 1 to 12, preferably from 1 to 6, more preferably from 1 to 3, most preferably 1.

The amination agent preferably has the general formula

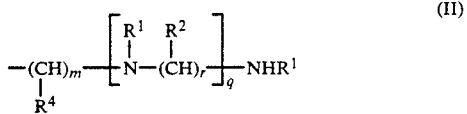

Representative primary and secondary amines include the methyl amine, ethyl amine, butyl amine, cyclohexyl amine, dimethyl amine and diethyl amine. Also diamines are useful such as alkylene diamines, preferably 1,3-diaminopropane, 1,4-diaminobutane or 1,6-diaminohexane. A preferred amination agent is a polyamine or oligomamine such as $H-(NH-CH_2-CH_2-)_q-NH_2$.

A further preferred amination agent is hexamethylene tetramine (urotropin). After amination and hydrolysis resins having $-(CHR^4)_m-NH_2$ groups are produced.

Amination with a compound of formula V generally comprises heating with reflux a mixture of the haloalkylated copolymer beads and at least a stoichiometric amount of the aminating agent to a temperature sufficient to react the aminating agent with the halogen atoms. A reaction medium such as water, ethanol, methanol, methylene chloride, ethylene dichloride, dimethoxymethylene or combinations thereof is optionally, but advantageously employed. A complete amination is generally obtained within about 2 to about 24 hours at reaction temperatures between about 25° C. and about 150° C.

Resins having functional groups of formula II wherein $R^1$ and $R^2$ have a meaning other than hydrogen can be prepared by selecting those compounds of formula V having the desired radicals $R^1$ and $R^2$ as an aminating agent or by converting after amination a resin having functional groups af formula II wherein $R^1$ and/or $R^2$ are hydrogen into a resin having functional groups of formula II wherein $R^1$ and/or $R^2$ have a meaning other than hydrogen in a known way. For example, the radicals alkyl, $-(CH_2)_n-COOR^5$, $-(CH_2)_p-SO_3R^3$, $-(CH_2)_p-PO_3(R^5)_2$ can be introduced into a group of formula II by reacting a group of formula II wherein $R^1$ is hydrogen with a compound of formula X-alkyl, $X-(CH_2)_n-COOR^5$, $X-(CH_2)_p-SO_3R^3$ or $X-(CH_2)_p-PO_3(R^5)_2$ wherein X is halogen, preferably chlorine.

Resins having functional groups of formula II wherein $R^1$ is $-CH_2-SO_3R^3$, $-CH_2-COOR^5$ or $-(CH_2)-PO_3(R^5)_2$ can for example also be prepared by subjecting a functional group of formula II wherein $R^1$ is hydrogen to a sulfomethylation, a carboxymethylation or a phosphomethylation step. The phosphomethylation can for example be carried out with formaldehyde or with a formaldehyde derivative stated below and with $H(R^5)_2PO_3$. The sulfomethylation can for example be carried out with formaldehyde or with a formaldehyde derivative stated below and with $(R^3)_2SO_3$ or $(R^3)_2S_2O_5$.

The described methods are particularly suitable for preparing resins having functional groups of formula II and having a poly(vinyl aromatic) copolymer matrix such as cross-linked polystyrene beads. Further methods of haloalkylation and amination of poly(vinyl aromatic) copolymer beads are described in WO-83/02947, WO 86/03988 and in U.S. Pat. Nos. 3,037,945, 4,002,564 and U.S. Pat. No. 4,442,231. Further methods of preparing resins having aminoalkyl groups are described in U.S. Pat. Nos. 3,882,053 and 3,989,650.

The chloromethylated copolymer beads having a core/shell morphology employed in Example 1 to 13 are prepared from commercially available styrene/divinylbenzene beads having a core/shell morphology by chloromethylating the beads with chloromethyl ether according to the teachings of "Ullmann's Enzyklopädie der Technischen Chemie", 4th Edition, Vol. 13, pages 300 et seq. and European Patent Application 101 943. The preparation of the styrene/divinylbenzene beads having a core/shell morphology is also disclosed in European Patent Application 101 943.

Methods of converting polymer beads other than poly(vinyl aromatic) beads to resins having functional groups of formula II are illustrated in Helfferich, supra, pages 48 to 58.

The ion exchange resin beads of the present invention having (aminomethyl) (hydroxymethyl)phosphinic acid groups, preferably the functional groups of formula I, are prepared by reacting resin beads having i) primary or secondary amino groups, preferably groups of formula II, and ii) a matrix of a cross-linked polymer wherein the level of cross-linkages is decreased in the shell area as compared to the core area with a1) a hypophosphite salt in the presence of an acid or a2) hypophosphorous acid and b) formaldehyde or a formaldehyde releasing compound.

An analogous process is known from German Offenlegungsschrift 28 48 289 for macroporous resins.

Various hypophosphite salts are useful, preferably the alkali or alkaline earth metal salts, such as the sodium, calcium or barium hypophosphite. The hypophosphite salt is used together with an acid, preferably with an inorganic acid such as sulfuric acid, hydrochloric acid, phosphoric acid or nitric acid.

Preferably, the molar ratio between the hypophosphite salt and the inorganic acid is from 1 to 20:1, more preferably from 5 to 15:1, most preferably from 7 to 12:1. Instead of using a hypophosphite salt and an acid, hypophosphorous acid may be used. The molar ratio between the hypophosphite or hypophosphorous acid and the primary or secondary amino groups preferably is from 1 to 20:1, more preferably from 3 to 15:1 and most preferably from 6 to 12:1.

Formaldehyde releasing compounds are known. For example, paraformaldehyde or trioxane is useful which decomposes under acidic conditions to give formaldehyde. Alternatively formalin which is a 35 to 37 weight percent aqueous solution of formaldehyde is useful. Preferably, the molar ratio between formaldehyde and the primary or secondary amino groups is from 1 to 20:1, more preferably from 5 to 12:1.

The reaction is carried out under acidic conditions, preferably at a pH of less than 3. Typically the reaction is carried out at a temperature of from 40° C. to 150° C., more preferably of from 70° C. to 100° C. Typically the reaction is completed within 1 to 25 hours, preferably within 5 to 25 hours, more preferably within 8 to 20 hours.

According to the described process ion exchange resin beads having functional groups of formula I wherein $R^3$ is hydrogen and $R^1$ typically is hydrogen or —$CH_2$—$PO_2H$—$CH_2OH$ are produced.

Ion exchange resin beads having functional groups of formula I wherein at least some of the radicals $R^1$ are —$CH_2$—$PO_3H_2$ and the remaining radicals $R^1$ are hydrogen or —$CH_2$—$PO_2H$—$CH_2OH$ may be produced by using a combination of a hypophosphite salt or hypophosphorous acid and phosphorous acid. The reaction may be carried out in the presence of an additional acid, preferably one of the above mentioned inorganic acids. The molar ratio between the hypophosphite salt and the mentioned acid as well as the molar ratio between phosphorous acid and the mentioned additional acid preferably is from 1 to 20:1, more preferably from 5 to 15:1. The molar ratio between the hypophosphite salt or hypophosphorous acid and phosphorous acid generally is from 0.05 to 10:1, preferably from 0.9 to 5:1. Most preferably, the molar ratio between the hypophosphite salt or hypophosphorous acid and phosphorous acid is about 1:1. Instead of phosphorous acid phosphite salts may be used, preferably the alkali or alkaline earth metal salts of phosphorous acid, more preferably the sodium or potassium phosphite. Phosphorous acid may be produced in situ from phosphorous halides or oxides, preferably $P_2O_5$, $PBR_3$ and, in particular, $PCl_3$ in the presence of an acid, preferably an above mentioned inorganic acid. Mono- or diesters of phosphorous acid, preferably mono- or dialkylesters, such as mono- or di-$C_{1-6}$-alkylesters of phosphorous acid are useful for preparing ion exchange resin beads having functional groups of formula I wherein at least some of the radicals $R^1$ are —$CH_2$—$PO_3(R^5)_2$ wherein each $R^5$ is alkyl or cycloalkyl of 1 to 12 carbon atoms.

Resin beads having functional groups of formula I wherein $R^1$ has a meaning other than hydrogen are typically prepared by selecting those resin beads having functional groups of formula II having the desired radical $R^1$.

Resin beads having functional groups of formula I wherein $R^3$ is a cation are usually prepared by reacting resin beads having functional groups of formula I where $R^3$ is hydrogen with a basic compound having the desired cation such as NaOH.

Those ion exchange resin beads of the present invention having an above mentioned matrix and functional groups of formula I wherein:

each $R^1$ independently is hydrogen or —$CH_2$—$PO_2R^3$—$CH_2OH$;

q is zero;

each $R^3$ independently is hydrogen or a cation;

each $R^4$ independently is hydrogen, alkyl, cycloalkyl or aryl; and m is from 1 to 12, preferably from 1 to 6, more preferably from 1 to 3, may be prepared according to a new, efficient process by reacting resin beads having groups of formula

$$-(CH)_m-X \atop R^4 \qquad (III)$$

wherein X is halogen, preferably chlorine, and $R^4$ and m have the meanings stated above and having an above mentioned matrix with hexamethylene tetramine to produce the corresponding resin beads having functional groups of formula IV

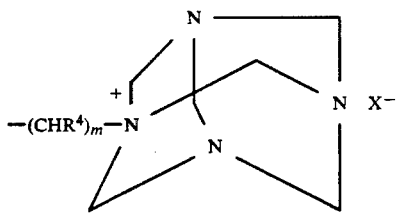

(IV)

and reacting the produced intermediate having groups of formula IV with a hypophosphite salt in the presence of an acid or with hypophosphorous acid in a single step in the presence of water without addition of a substantial amount of formaldehyde or a formaldehyde releasing compound.

By the expression "without addition of a substantial amount of formaldehyde or a formaldehyde releasing compound" is meant that less than about 10 percent, preferably less than about 5 percent and more preferably less than about 2 percent of formaldehyde or a formaldehyde releasing compound, which is consumed when introducing —P(O)(OR$^3$)—CH$_2$OH groups into the resin beads, is added to the beads having functional groups of formula IV. Most preferably, no formaldehyde or formaldehyde releasing compound is added to the beads having functional groups of formula IV.

This process of the present invention has several advantages. According to the process described in German Offenlegungsschrift 28 48 289 a macroporous styrene-divinylbenzene polymer containing alpha-aminophosphinic acid groups is prepared from poly(vinylbenzylamine) which is obtained by aminating macroporous chloromethylated styrene divinylbenzene polymers with urotropin (hexamethylene tetramine). The obtained intermediate hexamethylenetetramine/resin complex must be subjected to hydrolysis for producing the poly(vinylbenzylamine). Typically the hydrolysis is followed by a drying and washing step. In the hydrolysis step formaldehyde is released when the aminated resin is contacted with water. The formaldehyde contaminates the wash water and the drying step consumes energy. According to the process of the present invention, the separate hydrolysis and the waste of 6 moles of formaldehyde per mole of produced primary amine group is avoided. Furthermore, an energy consuming drying and washing step of aminated, hydrolyzed resin beads is not necessary in the process of the present invention.

Surprisingly, it has been found that the ion exchange capacities, such as the copper capacity and the calcium capacity, of the ion exchange resin beads of the present invention which have been produced by reacting resin beads having functional groups of formula IV a) with an acid in order to hydrolyze the groups of formula IV, washing and drying the resin beads and then reacting the beads with hypophosphorous acid or a hypophosphite salt/acid mixture and formaldehyde or b) with hypophosphorous acid or a hypophosphite salt/acid mixture without addition of formaldehyde are comparable.

A time and energy consuming separation and purification of the polymer beads after hydrolysis and addition of fresh formaldehyde is unnecessary in process b) of the present invention. In process b) a portion of the formaldehyde is consumed which is produced when the polymer beads having groups of formula IV are contacted with water which is present in the step of introducing —P(O)(OR$^3$)—CH$_2$OH groups into the resin beads.

The above mentioned hypophosphite salts, acids, temperature ranges, reaction times and molar ratios are useful in process b). When a hypophosphite salt/acid mixture is used, the acid may be added to the resin beads having functional groups of formula IV prior to or after the hypophosphite salt. It is not very critical whether a solid hypophosphite salt is added to an aqueous suspension of the polymer beads or whether the polymer beads are added to an aqueous solution of the hypophosphite salt and/or of the acid, however, the process of the present invention has to be carried out in the presence of water. The same is true when hypophosphorous acid is used instead of a hypophosphite/acid mixture. The amount of water is not very critical but it should be sufficient to allow the formation of formaldehyde when the polymer beads are contacted with water and acid. It should also be sufficient to suspend the polymer beads and to dissolve the hypophosphite. The skilled artisan knows the amount of water which is useful in the described processes.

The ion exchange resin beads of the present invention, in particular those having functional groups of formula I wherein each R$^3$ is hydrogen or an alkali metal ion, are useful in a method of reducing the concentration of alkaline earth or transition metal ions in a solution containing such ions, for example in water treatment and in precious metal recovery.

The resin beads of the present invention have amphoteric properties. Accordingly, they are useful for removing salts from solutions, for example in water treatment and purification, and in the processing, purification and separation of various amino acids and sugars.

The resin beads of the present invention have unexpected advantages in a method of reducing the concentration of multi-valent cations of alkaline earth and transition metals in a solution containing such ions compared to the macroporous beads disclosed in German Offenlegungsschrift 28 48 289. The resin beads of the present invention have good combinations of dynamic capacity, osmotic shock resistance and mechanical crush resistance. This combination of properties is especially essential for commercial scale processes and resins which are to be used in the purification of concentrated aqueous salt solutions such as brines. Among other uses, salt solutions (brines) can then be supplied to membrane electrolysis cells for chlorine production. For this process of brine purification, the calcium concentration must be reduced to levels of less than 50 parts per billion (0.05 mg/l) in large quantities of highly concentrated brine solution. After their use, the resins are regenerated by treatment with acid, caustic, and concentrated salt solution which produce severe osmotic strain or shock on the structure of the copolymer beads. Thus, the excellent osmotic and mechanical strength of the resin beads must be accompanied by a large capacity and/or selectively, especially for calcium and magnesium ions for this particular application.

It has been found that a large equilibrium capacity of a chelating or ion exchange resin does not necessarily means that the dynamic capacity will be sufficient for commercial use of such resin. The total equilibrium capacity is measured under ideal conditions and gives the total capacity available. Under actual performance conditions, for various reasons, only a portion of the total equilibrium capacity is used in removing ions from the solution to be purified. At some point as the capacity is being used, the rate of ion removal becomes to low and unacceptable levels of ions remain in the solution as it leaves the resin bed. The dynamic total capacity (as this term is used herein) of a resin is therefore a better measure of its performance under actual ion exchange or chelating conditions. It is desirably a large portion of the total equilibrium capacity. The resin beads of the present invention have a high dynamic capacity. The "dynamic" total calcium capacity and the total copper capacity are measured according to the test methods described below in connection with the experiments.

In methods of reducing the concentration of multivalent alkaline earth or transition metal ions functionalized resin beads as described above should be used, which have a dynamic capacity for such ions (as tested by the method described herein) of at least 0.3 equivalents of ions per liter resin (when the resin is in the Na form), preferably at least 0.5 equivalent ions per liter resin, typically in the range of from 0.5 to 2.0 equivalents ions per liter resin.

It has been found especially desirable and advantageous to reduce the concentration of alkaline earth and transition metal ions in solutions containing such ions at elevated temperatures, typically at 35° C. or higher. It is preferred to operate on such solutions, preferably on aqueous solutions, at temperatures of at least 40° C., preferably at least 50° C. and up to about 80° C., preferably up to about 70° C. Surprisingly, improved dynamic capacities of the resin beads of the present invention are observed, compared to the macroporous resins disclosed in German Offenlegungsschrift 28 48 289, at temperatures of at least 35° C., preferably at least 40° C.

In combination with the excellent dynamic capacities exhibited by the resins according to this invention, there is also observed outstanding osmotic shock resistance. Under the osmotic shock test conditions similar to those described in DIN method 54406, it has been found that greater than 90 percent of the beads remain unbroken after 50 cycles of 4 molar HCL, water, 4 molar NaOH, and water. It is preferred that more than 95 percent of the beads remain unbroken and very desirable for more than 98 percent of the beads to remain unbroken.

It is also important for these resins, which will be used in large quantities, to exhibit good resistance to mechanical forces. It has been found that such chelating resins exhibit an average crush strength of greater than 800 grams (g) per bead, preferably greater than 1000 g per bead.

The invention is further illustrated by the following examples which should not be construed to limit the scope of the present invention. Unless otherwise mentioned, all parts and percentages are weight parts and weight percentages. The total copper wet volume capacity and the dynamic total calcium capacity of the resin beads of the present invention are measured as described below.

The total copper wet volume capacity of the sodium form of the ion exchange resin is determined by contacting the resin beads with a solution of 60 g of Cu$SO_4.5H_2$) and 120 ml of concentrated ammonium hydroxide diluted with water to 1 liter, washing the beads with water to remove excess copper and then with 2N sulfuric acid to remove the copper ions bound to the functional groups. The amount of copper removed from the beads with 2N sulfuric acid is determined using a potassium iodide/sodium thiosulphate oxidation/reduction titration.

The total copper wet volume capacity is expressed as milli equivalents per ml of wet resin.

The dynamic total calcium capacity for an ion exchange resin is determined using the sodium form of the resin at a pH of 10 to 12. The resin is transferred to a column equipped with a heating jacket. A chemically pretreated brine containing up to 2 milligrams calcium per liter of brine is passed through the resin at 60° C. and at a flow rate of 30 bed volumes of brine per hour. During the run the column effluent is monitored for calcium by colorimetry. This is done in order to determine when the resin bed is no longer removing the calcium to a sufficiently low level. This endpoint is set at 0.05 milligrams calcium per liter brine. With the ion exchange resin beads of the invention the calcium concentration is below 0.02 milligrams calcium per liter brine for most of the cycle. When the endpoint of 0.05 milligrams calcium per liter brine is reached in the effluent, the regeneration of the resin is initiated by treating it with acid, deionized water and caustic. The solutions which are thus collected from the column are analyzed for calcium and the value for the resin dynamic capacity is calculated. The dynamic total calcium capacity is expressed as grams calcium per liter of resin.

In the examination of the resin beads to determine the bead morphology, an electron scanning microscope is used. In the following Examples, chloromethylated copolymer beads having an above described core/shell morphology-type matrix are used for preparing the ion exchange resin of the present invention. The chloromethylated copolymer beads having a core/shell morphology-type matrix can be prepared in a known way according to the teaching of European Patent Application 101 943. A general description how to produce these resin beads is stated below. The skilled artisan knows how to adapt the described process for producing similar resin beads with different degrees of crosslinking etc.

RESIN BEAD PREPARATION

Copolymer beads having a core/shell morphology are prepared according to the teachings of European Patent Application 101 943. They are prepared by initially forming a suspension of matrixes of a cross-linked polymer of styrene and divinylbenzene (seed particles) and continuously supplying to this suspension an additional monomer feed of styrene (98.5 percent) and divinylbenzene (1.5 percent). This is done under conditions such that polymerization initiating free radicals existed in the suspended cross-linked poly (stryene-divinylbenzene) matrixes but during the final additional monomer addition no further free-radical initiator is added. At least a portion of the additional monomer feed is imbibed by such matrixes. This additional monomer is polymerized to provide additional polymer both in existing matrix and as a shell. In this way gel-type resin beads having core/shell morphology are formed having a decreased level of cross-linkages in the shell area as compared to the core. The beads have a granulometric distribution between 250 and 600 micrometers.

FUNCTIONALIZATION

Chloromethylation is accomplished by the addition of 740 weight parts of chloromethylmethylether with 146 weight parts of the styrene/divinylbenzene copolymer in an agitated reactor. 44 weight parts of ferric chloride are added to the mixture and the temperature is raised to 50.5° C. for 3 hours. The reaction mixture is then cooled to 13° C., the excess ether is removed and the chloromethylated copolymer is treated with methanol several times.

EXAMPLE 1

220 ml (190 g wet weight) of chloromethylated copolymer beads are swollen in 350 ml of formaldehyde dimethyl acetal at 43° C. for 45 minutes. The chloromethylated copolymer beads have a cross-linked styrene-divinylbenzene copolymer matrix and have a core/shell morphology. The copolymer beads contain about 8 percent copolymerized divinylbenzene in the core and about 3 percent copolymerized divinylbenzene in the shell, based on the total copolymer weight. The chloromethylated beads have a wet volume capacity of 1.4 meq/ml.

To the mixture of the chloromethylated beads and formaldehyde dimethyl acetal a solution of 215 g of hexamethylene tetramine in 280 g of water is added. The reaction mixture is stirred for 6 hours and the temperature is maintained at 45° C. The produced resin beads having groups of formula IV wherein $R^4$ is hydrogen, m is 1 and X is chlorine are filtrated and thoroughly washed with water. 130 ml of the produced resin beads contain 0.15 moles of the groups of formula IV.

130 ml of the produced resin beads having the groups of formula IV are stirred in a solution of 188 g (1.77 mols) of sodium hyposphite in 200 ml of concentrated hydrochloric acid. The mixture is heated to 90° C. and the temperature is maintained for 20 hours. After cooling to room temperature and washing the produced resin beads with water, their total copper wet volume capacity is determined to be 1.6 meq/ml. The dynamic total calcium capacity is 4.7 g calcium per liter of resin. After regeneration with 4N hydrochloric acid and 4N sodium hydroxide the dynamic total calcium capacity is 3.5 g calcium per liter of resin.

EXAMPLE 2

168 g of the resin beads having the functional groups of formula IV produced according to Example 1 are hydrolyzed with 500 ml of a 16 percent aqueous solution of hydrochloric acid. The mixture is stirred at 45° C. for 4 hours and then thoroughly washed with water. The aminomethylated polymer beads have a weak base capacity of 1.4 meq/ml. 110 ml of the hydrolyzed resin beads which contain 0.15 mols of primary amine groups are reacted with a solution of 188 g (1.77 mols) sodium hypophosphite in 200 ml of 16 weight percent aqueous hydrochloric acid. 53.4 g (1.78 mols) of paraformaldehyde is added the reaction mixture and the mixture is heated to 90° C. The temperature is maintained for 20 hours. After cooling to room temperature and washing the resin with water its total copper wet volume capacity is determined to be 1.5 meq/ml. The dynamic total calcium capacity is 4.1 g calcium per liter of resin. After regeneration with 4N hydrochloric acid and 4N sodium hydroxide the dynamic total calcium capacity is 3.5 g calcium per liter of resin.

Examples 1 and 2 illustrate that the ion exchange resin beads of the present invention which have a core/shell morphology and which have been functionalized
a) analogously to the process described in the German Offenlegungsschrift 28 48 289 or
b) according to the new, more efficient process described above without addition of formaldehyde to the resin beads have the functional groups of formula IV have comparable ion exchange capacities.

COMPARATIVE EXAMPLE A

Commercially available macroporous styrene/divinylbenzene beads which have a divinylbenzene content of 6 percent are chloromethylated analogously to the chloromethylation of polymer beads having a core/shell morphology described above under "functionalization". The chloromethylation of macroporous styrene/divinylbenzene beads is also described in "Ullmann's Enzyklopädie der Technischen Chemie", 4th Edition, Vol. 13, pages 300 et seq. The wet volume capacity of the macroporous chloromethylated resin beads is 1.2 meq/ml.

The chloromethylated resin beads are reacted with hexamethylene tetramine as described in Example 1. 130 ml of the produced macroporous resin beads having functional groups of formula IV wherein $R^4$ is hydrogen, X is chlorine and m is 1 are reacted with a solution of 160 g of sodium hypophosphite (1.5 mols) in 180 ml of concentrated hydrochloric acid at 90° C. for 20 hours. After cooling to room temperature and washing the resin beads with water, their total copper wet volume capacity is determined to be 1.8 meq/ml. The dynamic total calcium capacity is 1.1 g calcium per liter of resin. After regeneration with 4N hydrochloric acid and 4N sodium hydroxide the dynamic total calcium capacity is 1.0 g calcium per liter of resin.

COMPARATIVE EXAMPLE B

Macroporous chloromethylated polymer beads are produced as described in Comparative Example A and hydrolyzed as described in Example 2. 110 ml of the hydrolyzed macroporous resin beads which contain 0.14 mols of primary amino groups are reacted with 160 g of sodium hypophosphite (1.5 mols) and 48 g of paraformaldehyde (1.6 mols) dissolved in 180 ml of concentrated hydrochloric acid at 90° C. for 20 hours. After cooling to room temperature and washing the produced resin beads with water their total copper wet volume capacity is determined to be 1.7 meq/ml. The dynamic total calcium capacity is 1.1 g calcium per liter of resin beads. After the resin beads have been regenerated with 4N hydrochloric acid and 4N sodium hydroxide, the dynamic total calcium capacity is 1.2 g calcium per liter of resin beads.

The comparison between Example 1 and 2 and Comparative Examples A and B illustrates that the new resin beads of the present invention having a core/shell morphology have ion exchange capacities which are comparative to the known macroporous resins at room temperature (compare their total copper wet volume capacities). However, the resin beads of the present invention have much higher ion exchange capacities than the known macroporous resin beads at elevated temperatures (compare their dynamic total calcium capacities).

The bead morphology of the resin beads produced according to Example 1 and Comparative Example A have been determined using an electron scanning microscope.

FIG. 1 shows the distribution of —P(O)(OH)—CH$_2$—OH groups in a macroporous polymer bead produced according to Comparative Example A. The (aminomethyl) (hydroxymethyl) phosphinic acid groups are distributed more or less evenly over the entire resin bead. The core of the bead even comprises the highest amount of (aminomethyl)(hydroxymethyl) phosphinic acid groups. However, the aminomethylphosphinic groups in the core of a bead are not effective in an ion exchange process.

Figure 2:
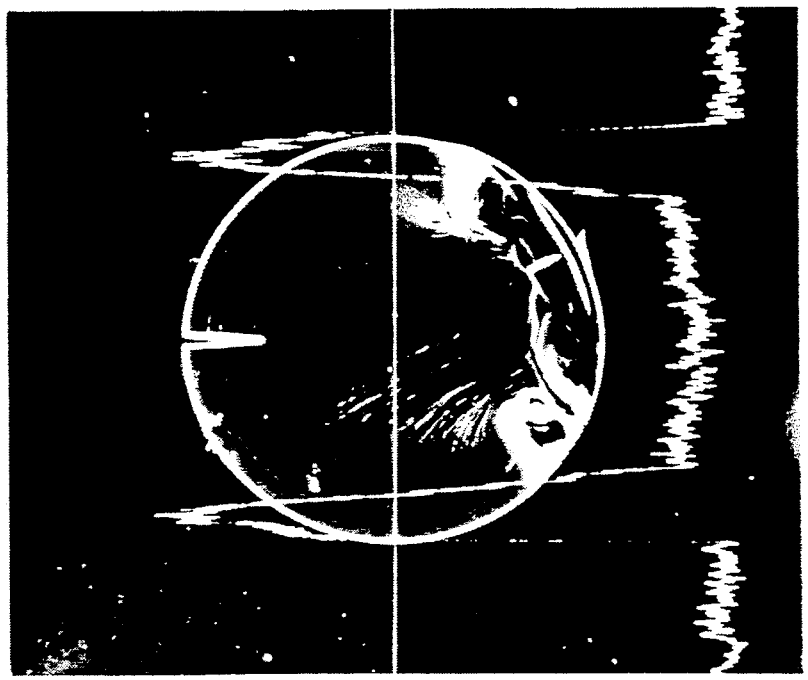
FIG. 2 illustrates the distribution of (aminomethyl)-(hydroxymethyl)phosphinic acid groups in the ion exchange resin beads of the present invention.

FIG. 2 shows the distribution of $-P(O)(OH)-CH_2-OH$ groups of an ion exchange resin bead of the present invention produced according to Example 1. FIG. 2 shows that essentially all (aminomethyl(hydroxymethyl)-phosphinic acid groups are located in the shell of the resin bead. The functional groups in the shell of a resin bead are effective in an ion exchange process.

EXAMPLE 3

Example 1 is repeated, however, the resin beads having the functional groups of formula IV wherein $R^4$ is hydrogen, X is chlorine and m is 1 are allowed to react with the sodium hypophosphite/hydrochloric acid mixture only for 4 hours instead of 20 hours. The total copper wet volume capacity is 1.0 meq/ml.

Example 3 illustrates that the reaction period preferably is from 5 to 25 hours, more preferably 8 to 20 hours.

EXAMPLE 4

Example 1 is repeated, however, 130 ml of the polymer beads having the functional groups of formula IV are reacted with 90 g (0.84 mols) of sodium hypophosphite in 175 ml of a 16 weight percent aqueous solution of hydrochloric acid (instead of with 188 g of sodium hypophosphite in 200 ml of concentrated hydrochloric acid). The total copper wet volume capacity is 0.9 meq/ml.

Example 4 illustrates that the molar ratio of the hypophosphite salt to the groups of formula II most preferably is from 6 to 12:1.

EXAMPLE 5

Resin beads having a core/shell morphology and functional groups of formula IV wherein $R^4$ is hydrogen, X is halogen and m is 1 are prepared as in Example 1. 130 ml of the resin beads are reacted with a solution of 90 g of sodium hypophosphite ($NaH_2PO_2 \cdot H_2O$) (0.84 mol) and 16 g (0.2 mol) of phosphorous acid in 175 ml of 16 weight percent aqueous hydrochloric acid. The molar ratio between sodium hypophosphite and groups of formula IV is 5.6:1. The molar ratio between phosphorous acid and the groups of formula IV is 5.6:1. The molar ratio between phosphorous acid and the groups of formula IV is 1.2:1. The molar ratio between sodium hypophosphite and phosphorous acid is about 4.5:1. The mixture is heated to 90° C. and maintained at this temperature for 20 hours. After cooling to room temperature and washing the resin beads with water, their total copper wet volume capacity is determined to be 1.0 meq/ml.

EXAMPLE 6

Example 5 is repeated, however, 72.5 g of phosphorous acid (0.88 mol) dissolved in 100 ml of 16 weight percent hydrochloric acid is used (instead of 16 g of phosphorous acid in 175 ml of 16 weight percent aqueous hydrochloric acid). The molar ratio between sodium hypophosphite and phosphorous acid is about 1:1. After cooling to room temperature and washing the resin beads with water, their total copper wet volume capacity is determined to be 1.3 meq/ml.

EXAMPLE 7

Example 5 is repeated however 16 g (0.15 mol) of sodium hypophosphite (instead of 90 g) is used and 72.5 g (0.88 mol) of phosphorous acid is used (instead of 16 g of phosphorous acid). The molar ratio between sodium hypophosphite and groups of formula IV is about 1:1, the molar ratio between phosphorous acid and functional groups of formula IV is about 5.8:1 and the molar ratio between sodium hypophosphite and phosphorous acid is about 0.16:1. The total copper wet volume capacity is 0.7 meq/ml.

According to Examples 5 to 7 ion exchange resin beads are prepared which have functional groups of formula I wherein each $R^1$ independently is hydrogen, $-CH_2-PO_2R^3-CH_2OH$ or $-CH_2-PO_3(R^3)_2$ provided that at least some of the radicals $R^1$ are $-CH_2-PO_3(R^3)_2$, $R^3$ and $R^4$ are hydrogen, m is 1 and q is 0.

EXAMPLE 8

60 ml of chloromethylated resin beads having a core/shell morphology produced according to Example 1 are swollen in 90 ml of methylal for 45 minutes at 45° C. 200 ml of diethylene triamine are then added and the mixture is heated for 6 hours at 70° C. The aminated resins are washed with diluted hydrochloric acid and then with water. 40 ml of the aminated resin beads are reacted with 80 g of sodium hypophosphite and 20 g of paraformaldehyde, dissolved in 100 ml of concentrated hydrochloric acid at 90° C. for 20 hours.

Ion exchange resin beads are prepared having functional groups of formula I wherein each $R^1$ independently is hydrogen or $-CH_2PO_2R^3-CH_2OH$, $R^2$, $R^3$ and $R^4$ are hydrogen, m is 1, r is 2 and q is 2. The functional groups of formula I form a strong complex with copper ions. When determining the copper capacity of the produced resin beads, the copper cannot be removed with 2N sulfuric acid as described in the standard procedure above. For determining the copper capacity the resin beads are treated with concentrated sulfuric acid for 5 hours at 200° C., Afterwards a small amount of concentrated nitric acid is added to dissolve the resin beads in an oxidative degradation. The copper content is determined in a known way by an atomic absorption method. The copper content is 0.73 meq/g of resin.

EXAMPLE 9

Chloromethylated resin beads having a core/shell morphology are prepared as in Example 1. 50 ml of the beads are swollen in 75 ml of methylal (formaldehyde dimethyl acetal) for 1 hour at 45° C. 200 ml of 1,3-propanediamine is added and the mixture is heated for 5 hours at 65° C. The prepared aminated resin beads are washed with diluted hydrochloric acid and with water.

40 ml of the resin beads are stirred in a solution of 80 g of sodium hypophosphite and 20 g of paraformaldehyde in 100 ml of concentrated hydrochloric acid at 90° C. for 20 hours. According to Example 9 ion exchange resin beads having functional groups of formula I are prepared wherein $R^1$, $R^2$, $R^3$, $R^4$ and m have the meanings stated in Example 8, r is 3 and q is 1. The copper wet volume capacity which is determined according to the above described standard procedure is 0.4 meq/ml of wet resin. The residual amount of copper which cannot be removed from the resin beads according to the described standard method is determined as described in Example 8. The residual amount is 0.47 meq/g of resin.

EXAMPLE 10

100 ml of the same resin beads having primary amino groups and a core/shell morphology as in Example 2 are placed into a reactor. A solution of 104 g of chloroacetic acid in 80 ml of water is prepared and cooled to less than 10° C. 45 g of a 50 percent aqueous solution of sodium hydroxide is slowly added to the solution of chloroacetic acid whereby the temperature is kept below 40° C. The combined solution is added to the reactor. An additional amount of 10 g of a 50 percent aqueous sodium hydroxide solution is added. The reaction mixture is heated to a temperature between 65° C. and 70° C., kept at this temperature for 4 hours and then cooled to ambient temperature. The solution containing the sodium chloroacetate is removed from the resin beads. The resin beads are washed twice with 500 ml of water while stirring for 30 minutes. The produced resin beads are washed several times. The total copper wet volume capacity of the carboxymethylated resin beads is 1.4 meq/ml.

50 g of sodium hypophosphite, 15 g of paraformaldehyde and 100 ml of concentrated hydrochloric acid are successively brought into a reactor and heated together with 40 ml of the produced carboxymethylated resin beads under stirring to 90° C. The reaction mixture is maintained at this temperature for 15 hours. After cooling to room temperature and washing the resin beads with water, their total copper wet volume capacity is determined to be 1.8 meq/ml.

According to Example 10 ion exchange resin beads having functional groups of formula I wherein each $R^1$ independently is hydrogen, $-CH_2COOR^3$ or $-CH_2PO_2R^3-CH_2OH$, provided that at least some of the radicals $R^1$ are $-CH_2COOR^3$, $R^3$ and $R^4$ are hydrogen, m is 1 and q is 0.

EXAMPLE 11

100 ml of the aminated resin beads having a core/shell morphology and primary amino groups prepared according to Example 2 are reacted with 150 ml of a 37 percent aqueous solution of formaldehyde and 30 ml of a 25 percent aqueous solution of sodium hydroxide at 70° C. for 3 hours. The resin beads are filtered off, washed with water and then reacted with 400 ml of a 38 to 40 percent aqueous solution of $NaHSO_3$ and 30 ml of 1 molar aqueous sulfuric acid at 70° C. for 6 hours. The total copper wet volume capacity of the produced beads is 0.7 meq/ml.

40 ml of the produced sulfomethylated resin beads are placed into a reactor. 50 g of sodium hypophosphite, 15 g of paraformaldehyde and 100 ml of concentrated hydrochloric acid are added. The mixture is heated to 90° C. and maintained at this temperature for 15 hours. The total copper wet volume capacity of the produced resin beads is 0.9 meq/ml.

Accordingly to Example 11 resin beads having functional groups of formula I are prepared wherein each $R^1$ independently is hydrogen, $-CH_2SO_3R^3$ or $-CH_2-PO_2R^3-CH_2OH$, provided that at least some of the radicals $R^1$ are $-CH_2-SO_3R^3$, $R^3$ and $R^4$ are hydrogen, m is 1 and q is 0.

EXAMPLE 12

Resin beads having a core/shell morphology and functional groups of formula IV wherein $R^4$ is hydrogen, m is 1 and X is halogen are prepared as in Example 1. 130 ml of the resin beads are suspended in a solution of 8 g (0.1 mol) of phosphorous acid in 100 ml of 16 percent aqueous hydrochloric acid. The mixture is heated to 90° C. and maintained at this temperature for 4 hours. The molar ratio between the functional groups of formula IV and phosphorous acid is 1.5:1. The total copper wet volume capacity wet volume capacity of the produced resin beads is 0.6 meq/ml.

120 ml of the resin beads are further reacted with 180 g of sodium hypophosphite and 53 g of paraformaldehyde in 200 ml of concentrated hydrochloric acid at 90° C. for 15 hours. The total copper wet volume capacity of the produced resin beads is 1.1 meq/ml.

According to Example 12 resin beads having functional groups of formula I are prepared wherein each $R^1$ independently is hydrogen, $-CH_2-PO_3(R^3)_2$ or $-CH_2PO_2R^3-CH_2OH$, provided that at least some of the radicals $R^1$ are $-CH_2-PO_3(R^3)_2$; $R^3$ and $R^4$ are hydrogen, m is 1 and q is 0.

EXAMPLE 13

130 ml of the same resin beads which have been used in Example 12 are reacted with a solution of 16 g (0.2 mol) phosphorous acid in 100 ml of a 16 percent aqueous solution of hydrochloric acid. The molar ratio between the functional groups of formula IV in the resin beads and phosphorous acid is 0.75:1. The reaction mixture is heated to 90° C. and maintained at this temperature for 4 hours. The total copper wet volume capacity is 1.08 meq/ml.

120 ml of the produced resin beads are further reacted with 180 g of sodium hypophosphite and 53 g of paraformaldehyde in 200 ml of concentrated hydrochloric acid at 90° C. for 15 hours. The total copper wet volume capacity of the produced resin beads is 1.3 meq/ml.

According to Example 13 ion exchange resin beads having functional groups of formula I are prepared wherein $R^1$, $R^3$, $R^4$, m and q have the meanings stated in Example 12.

Examples 12 and 13 illustrate that the molar ratios between phosphorous acid and functional groups of formula IV preferably are not more than 2:1, more preferably not more than 1:1 when the resin beads having groups of formula IV are prereacted with phosphorous acid.

What is claimed is:

1. A process for preparing ion exchange resin beads by reacting resin beads comprising:

(i) groups of formula $$-(CH)_m-X \atop |  \atop R^4 \qquad (III)$$

wherein:
each $R^4$ independently is hydrogen, alkyl, cycloalkyl, or aryl,
m is from 1 to 12, and
X is halogen; and ii) a matrix of a poly(vinyl aromatic) polymer which is cross-linked with a compound selected from the group consisting of alkyl acrylates and di- or polyvinyl compounds wherein the level of cross-linkages is decreased in the shell area as compared to the core area, with hexamethylene tetramine to produce the corresponding resin beads comprising functional groups of formula

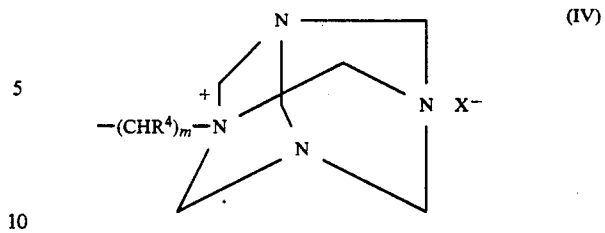

and reacting the produced intermediate comprising groups of formula IV with a1) a hypophosphite salt in the presence of an acid or with a2) hypophosphorous acid in a single step in the presence of water without addition of a substantial amount of formaldehyde or a formaldehyde releasing compound.

2. The process of claim 1 wherein the hypophosphite salt is employed together with an inorganic acid at a molar ratio of from 1:1 to 20:1.

3. The process of claim 2 wherein the reaction period is from 5 to 25 hours.

* * * * *